(12) United States Patent
Goto

(10) Patent No.: US 9,164,121 B2
(45) Date of Patent: Oct. 20, 2015

(54) MOTION SENSING

(71) Applicant: EMPIRE TECHNOLOGY DEVELOPMENT LLC, Wilmington, DE (US)

(72) Inventor: Hiroshi Goto, Ushiku (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/980,577

(22) PCT Filed: Nov. 7, 2012

(86) PCT No.: PCT/US2012/063760
§ 371 (c)(1),
(2) Date: Jul. 19, 2013

(87) PCT Pub. No.: WO2014/074092
PCT Pub. Date: May 15, 2014

(65) Prior Publication Data
US 2014/0123755 A1 May 8, 2014

(51) Int. Cl.
*G01P 15/00* (2006.01)
*G01P 15/12* (2006.01)
*G01P 15/03* (2006.01)

(52) U.S. Cl.
CPC .................................. *G01P 15/038* (2013.01)

(58) Field of Classification Search
USPC ............... 73/514.01, 514.03, 514.05, 514.09
See application file for complete search history.

(56) References Cited

U.S. PATENT DOCUMENTS

| | | | | |
|---|---|---|---|---|
| 2,391,966 | A | * | 1/1946 | Harrison ..................... 73/514.09 |
| 5,046,056 | A | * | 9/1991 | Sallas et al. .................. 367/166 |
| 5,242,863 | A | | 9/1993 | Xiang-Zheng et al. |
| 5,668,319 | A | * | 9/1997 | Garabedian ................ 73/514.09 |
| 6,789,424 | B2 | | 9/2004 | Knudsen et al. |
| 7,080,553 | B2 | | 7/2006 | Luo et al. |
| 7,980,141 | B2 | | 7/2011 | Connor et al. |
| 8,234,921 | B2 | * | 8/2012 | Shinogi ....................... 73/514.09 |
| 2004/0012062 | A1 | | 1/2004 | Miyajima et al. |
| 2006/0065051 | A1 | | 3/2006 | Balogh |
| 2007/0000324 | A9 | | 1/2007 | Pristup et al. |
| 2008/0072684 | A1 | * | 3/2008 | Baniecki et al. ................ 73/777 |

(Continued)

OTHER PUBLICATIONS

H. Jurgens Wolfaardt et al., "Dynamic Modeling of a Novel Microfluidic Channel Angular Accelerometer", Journal of Vibration and Control, 14(4), pp. 451-467, 2008, Published in Los Angeles, London, New Delhi, Singapore. [Downloaded from jvc.sagepub.com at Univ California San Diego on May 28, 2012].

(Continued)

*Primary Examiner* — Helen Kwok
(74) *Attorney, Agent, or Firm* — Ren-Sheng International

(57) ABSTRACT

Technologies are generally described for detecting acceleration by sensing a movement of a liquid contained in at least one liquid flow path arranged in a film-type material. An example device may be configured to detect acceleration based at least in part on an output signal from at least one strain sensor formed on at least one surface of a film layer. The film layer may include at least one liquid flow path containing a liquid and arranged in the film layer. The strain sensor may be formed on the at least one surface of the film layer in the vicinity of the least one liquid flow path, and may be configured to detect deformation on the at least one surface of the film layer.

40 Claims, 16 Drawing Sheets

(56) References Cited

U.S. PATENT DOCUMENTS

| | | |
|---|---|---|
| 2008/0173092 A1 | 7/2008 | Hattori et al. |
| 2008/0202240 A1 | 8/2008 | De Boer et al. |
| 2009/0029152 A1 | 1/2009 | Yun et al. |
| 2010/0251826 A1 | 10/2010 | Choi et al. |

OTHER PUBLICATIONS

Wei Xue et al., "Modeling and Design of Polymer-Based Tunneling Accelerometers by ANSYS/MATLAB", IEEE/ASME Transactions on Mechatronics, Aug. 2005, pp. 468-472, vol. 10, No. 4.

Notification of Transmittal of the International Search Report and the Written Opinion of the International Searching Authority, PCT/US2012/063760, Jan. 31, 2013.

"Electronic paper moves closer to mass-adoption," HP, 2009, <Retrieved on Apr. 16, 2014>, Retrieved from the Internet at <URL: http://web.archive.org/web/20120707004731/http://www.hpl.hp.com/news/2009/jan-mar/electronicpaper.html>.

"Research, development and commercialisation activities in printed intelligence," VTT Printed Intelligence, 2010, pp. 1-90, VTT Technical Research Centre of Finland.

* cited by examiner

MOTION SENSING

CROSS-REFERENCE TO RELATED APPLICATIONS

The present application is a national stage application under 35 U.S.C. §371 of International ApplicationPCT/US2012/063760, filed on Nov. 7, 2012 and entitled "MOTION SENSING." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Motion sensing techniques can be used to detect and generate various information (e.g., acceleration, angular velocity, etc.) input to mobile devices such as smartphones, tablet computers, etc. Such information can be used to identify the location or movement of a mobile device or a user of the device. Motion sensors or accelerometers provided for detecting such information are required to be implemented in a small size and have high sensitivity. Recently, MEMS (micro-electromechanical systems) technology is used for implementing accelerometers used in mobile devices. MEMS sensors may be fabricated on silicon substrates using micromachining technology in the form of microchips having a size of the order of 1 micrometer or less, which may be then mounted in a sensor unit with a size of a few millimeters on a printed circuit board.

Additionally, to provide more flexibility for a mobile device, there are demands for further reducing the thickness of components or frames for the device and also fabricating them with flexible materials in an integrated form. For example, electronic devices can be implemented on film substrates by means of printing technology such as printable electronics such that its display units can be flexible.

SUMMARY

Technologies are generally described for detecting a motion of a device using an accelerometer implemented in a flexible material such as a film-type material.

Various example apparatus or devices described herein may include a film layer and at least one strain sensor. The film layer may include at least one liquid flow path containing a liquid and arranged in the film layer. The at least one strain sensor may be formed on at least one surface of the film layer in the vicinity of the at least one liquid flow path. The at least one strain sensor may be configured to detect deformation on the at least one surface of the thin layer. The apparatus or devices may be configured to detect acceleration based on at least in part on an output signal from the least one strain sensor.

In some examples, accelerometers are described. The accelerometers may include upper and lower film layers and two strain sensors. The upper and lower film layers may be adhered to each other. At least one liquid flow path containing a liquid may be formed in at least one of the upper and lower film layers. One of the two strain sensors may be formed on a upper surface of the upper film layer while the other of the two strain sensors may be formed on a lower surface of the lower film layer, such that the at least one liquid flow path can be disposed substantially between the two strain sensors. Each of the two strain sensors may be configured to detect deformation on at least one surface of the upper and lower film layers. The accelerometers may be configured to detect acceleration based at least in part on an output signal from at least one of the two strain sensors.

In some examples, methods for fabricating an accelerometer are described. The example methods may include providing an upper film layer and a lower film layer. At least one liquid flow path may be formed in at least one of the upper and lower film layers. A liquid may be filled in the at least one liquid flow path. Two strain sensors may be formed on an upper surface of the upper film layer and a lower surface of the lower film layer, respectively. The upper film layer may be adhered to the lower film layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
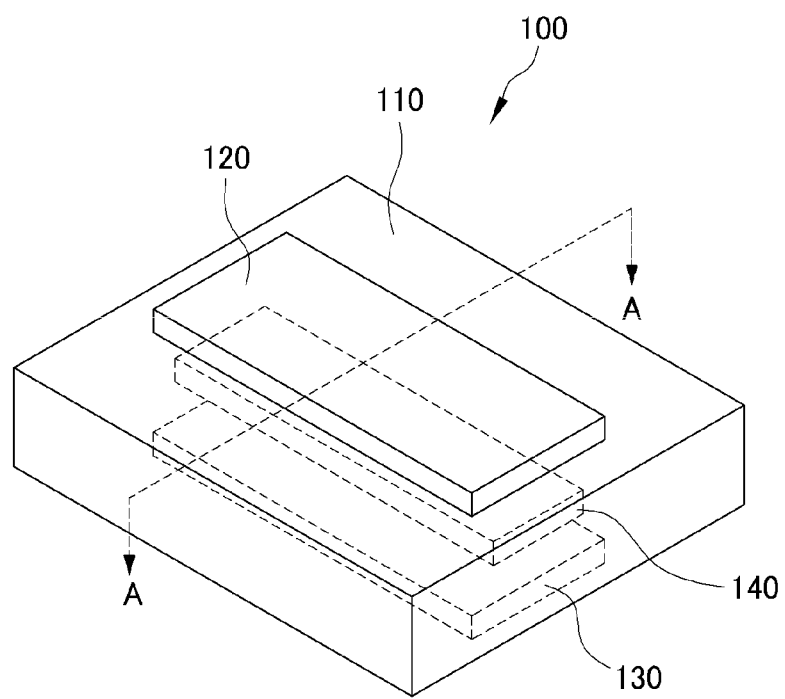
FIG. 1A schematically shows a perspective view of an example accelerometer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and devices related to detecting a motion of a device using an accelerometer implemented in a flexible material such as a film-type material.

Briefly stated, technologies are generally described for detecting acceleration by sensing a movement of a liquid contained in at least one liquid flow path arranged in a film-type material. Example devices may be configured to detect acceleration based at least in part on an output signal from at least one strain sensor formed on at least one surface of a film layer. The film layer may include at least one liquid flow path containing a liquid and arranged in the film layer. The strain sensor may be formed on the at least one surface of the film layer in the vicinity of the least one liquid flow path, and may be configured to detect deformation on the at least one surface of the film layer.

In some embodiments, the film layer may further include an upper and lower film layers adhered to each other. In this case, the at least one liquid flow path may be formed in at least one of the upper and lower film layers.

In some embodiments, the at least one strain sensor may include two strain sensors. One of the two strain sensors may be formed on an upper surface of the upper film layer and the other of the two strain sensors may be formed on a lower surface of the lower film layer, such that the at least one liquid flow path can be disposed between the two strain sensors. In such case, the accelerometers may be further configured to detect the acceleration based at least in part on difference between output signals from the two strain sensors.

In some embodiments, the film layers may be made of plastic resin, which may be optically transparent. For example, the plastic resin may include at least one of PET (polyethylene terephthalate), PC (polycarbonate), PEN (polyethylene naphthalate) and PI (polyimide). Alternatively, the film layers may be made of a thin film glass substrate.

In some embodiments, the strain sensors may be formed using a piezoelectric material. For example, the piezoelectric material may include at least one of PZT (lead zirconate titanate), AlN (aluminum nitride), BZT-BCT (barium zirconium titanate-barium calcium titanate), and PVDF (polyvinylidene fluoride). Alternatively, the strain sensors may be formed using a strain gauge including a thin metallic film.

In some embodiments, at least one surface of the liquid flow path may be water-repellent. For example, the at least one surface of the at least one liquid flow path may have a wedge-shaped structure or coated with a water-repellent material including fluoropolymer. The liquid contained in the liquid flow path may include a material such as metal nanoparticle ink, which has a higher specific gravity than that of water.

FIG. 1A schematically shows a perspective view of an example accelerometer, arranged in accordance with at least some embodiments described herein. As depicted, an example accelerometer 100 may include a film layer 110 and strain sensors 120 and 130 which are formed on an upper surface and a lower surface of film layer 110, respectively, such that elongated directions of strain sensors 120 and 130 are arranged substantially in parallel to each other. Further, a liquid flow path 140 may be formed in film layer 110 such that liquid flow path 140 may be disposed substantially between strain sensors 120 and 130 or disposed in the vicinity of at least one of strain sensors 120 and 130. An elongated direction of liquid flow path 140 may be arranged substantially in parallel to those of strain sensors 120 and 130. Each of strain sensors 120 and 130 may be configured to detect deformation on at least one of upper and lower surfaces of film layer 110. Although two strain sensors 120 and 130 are illustrated in FIG. 1 by means of an illustrative example, one strain sensor or three or more strain sensors may be formed on surfaces of film layer 110 according to various requirements and implementations.

In some embodiments, film layer 110 may be formed in a rectangular plate shape with its thickness smaller than either its width or length. Alternatively, film layer 110 may be formed in any other shape including, but not limited to, a polygonal or circular plate shape. Also, film layer 110 may be made of any film-type flexible material such as plastic resin. For example, film layer 110 may be formed using at least one of PET (polyethylene terephthalate), PC (polycarbonate), PEN (polyethylene naphthalate) and PI (polyimide). The material of film layer 110 may be optically transparent to facilitate bonding of two or more film layers using ultraviolet light, which will be described later. Alternatively, film layer 110 may be made of a thin film glass material, which has thermal resistance and optically transparent property.

Figure 1B:
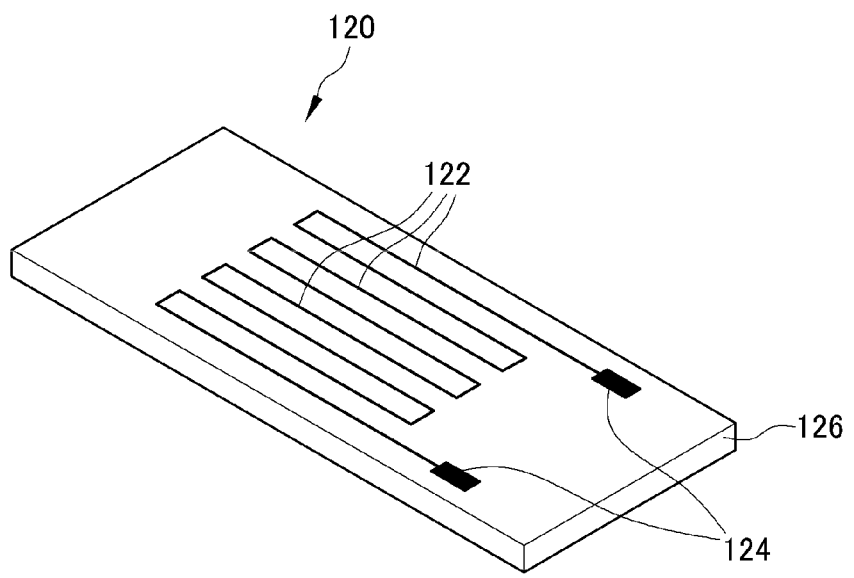
FIG. 1B schematically shows a perspective view of an example strain gauge.

In some embodiments, each of strain sensors 120 and 130 may be formed in a rectangular plate shape with its thickness smaller than either its width or length. As illustrated in FIG. 1, the width and length of each of strain sensors 120 and 130 may be set to be smaller than corresponding width and length of film layer 110 such that strain sensors 120 and 130 can be arranged within the upper and lower surfaces of film layer 110, respectively. Further, strain sensors 120 and 130 may be implemented using a piezoelectric material which may accumulate an electrical charge in response to a mechanical stress applied to the material. For example, strain sensors 120 and 130 may be formed using at least one of PZT (lead zirconate titanate), AlN (aluminum nitride), BZT-BCT (barium zirconium titanate-barium calcium titanate), and PVDF (polyvinylidene fluoride). Alternatively, strain sensors 120 and 130 may be formed using a strain gauge including a thin metallic film. FIG. 1B schematically shows a perspective view of an example strain gauge 120, arranged in accordance with at least some embodiments described herein. As depicted, strain gauge 120 may include an insulating flexible backing 126 which supports a metallic foil pattern 122. Strain gauge 120 may be attached to at least one surface of film layer 110 by a suitable adhesive. As film layer 110 is deformed, metallic foil pattern 122 may be deformed, causing its electrical resistance at terminals 124 to change.

Figure 2A:
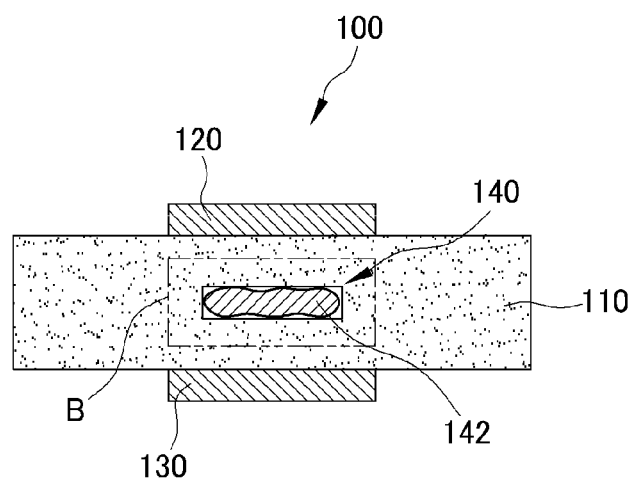
FIGS. 2A and 2B schematically show cross-sectional views of an example accelerometer.
Figure 2B:
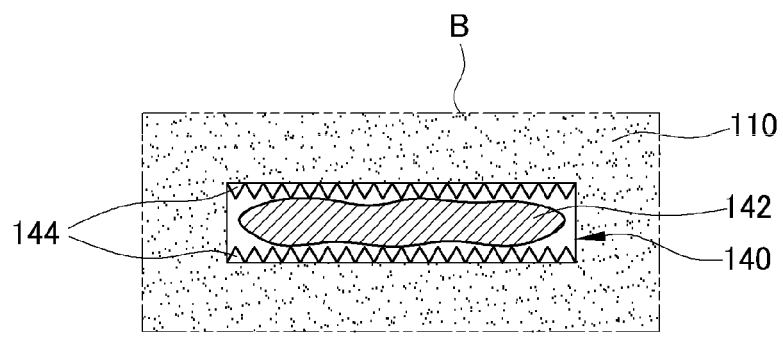

FIGS. 2A and 2B schematically show cross-sectional views of an example accelerometer, arranged in accordance with at least some embodiments described herein. In particular, FIG. 2A schematically shows a cross-sectional view of accelerometer 100, which is taken along the line A-A as indicated in FIG. 1. As illustrated, liquid flow path 140 may be disposed substantially between strain sensors 120 and 130 or disposed in the vicinity of at least one of strain sensors 120 and 130 in film layer 110. Liquid flow path 140 may be formed in an elongated rectangular shape and may contain a liquid 142 therein, which may have a higher specific gravity than that of water. For example, liquid 142 may include metal nanoparticle ink.

In some embodiments, the surfaces of liquid flow path 140 may be structured or treated to have water-repellent property, such that the surfaces of liquid flow path 140 may be easily wetted with liquid 142. The water-repellent property of liquid flow path 140 may serve to prevent liquid 142 from adhering to the surfaces of liquid flow path 140 such that liquid 142 freely move within liquid flow path 140 in response to acceleration, e.g., caused by a user's movement of accelerometer 100.

FIG. 2B illustrates an enlarged view of a portion B of the cross view shown in FIG. 2A. As shown, top and bottom surfaces of liquid flow path 140 may have a wedge-shaped structure, which may function to prevent liquid 142 from adhering to the surfaces of liquid flow path 140. Although the wedge-shaped structure is illustrated in FIG. 2B, any other types of structures such as a fin-shaped structure may be formed on at least one surface of liquid flow path 140 to provide water-repellent property. Alternatively and/or additionally, at least one surface of liquid flow path may be coated with a water-repellent material such as fluoropolymer.

Figure 3:
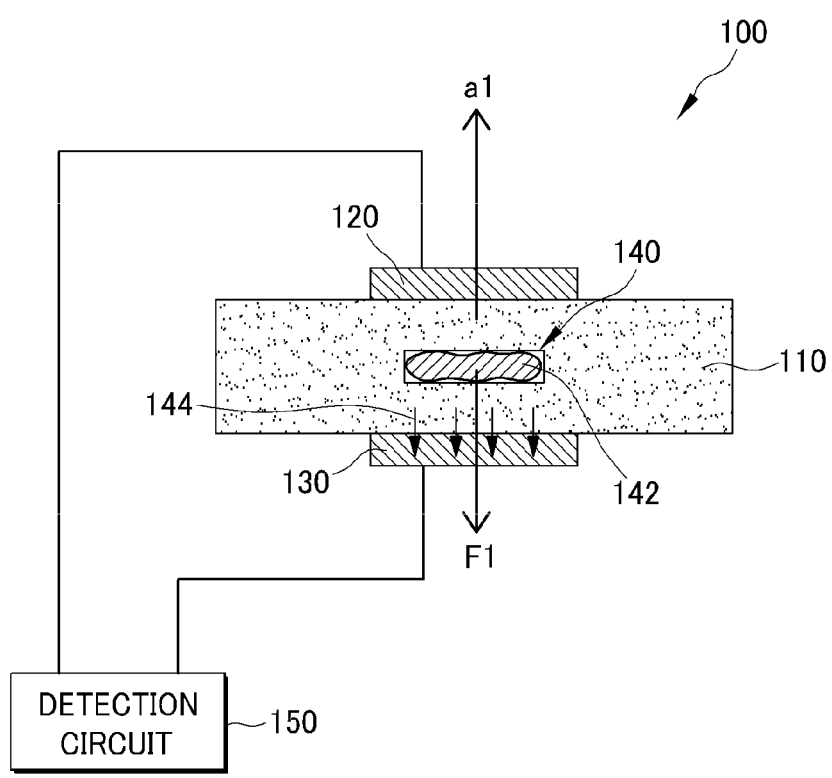
FIG. 3 schematically shows a cross-sectional view of an example accelerometer configured to detect a movement of a liquid contained in a liquid flow path in the accelerometer.

FIG. 3 schematically shows a cross-sectional view of an example accelerometer configured to detect a movement of a liquid contained in a liquid flow path in the accelerometer, arranged in accordance with at least some embodiments described herein. As depicted, strain sensors 120 and 130 of accelerometer 100 may be coupled to a detection circuit 150. Detection circuit 150 may be configured to detect acceleration based on at least in part on an output signal from at least one of strain sensors 120 and 130.

For example, let the mass of liquid 142 filled in liquid flow path 140 be denoted by m. Assuming that an acceleration a1 is applied to accelerometer 100, a force F1 (F1=m×a1) acting on liquid 142 may be generated substantially in an opposing direction to acceleration a1. Force F1 may cause a stress 144 on a lower surface of film layer 110, which may result in a strain on the lower surface of film layer 110. Since the amount of strain 144 is proportional to acceleration a1, acceleration a1 applied to accelerometer 100 may be detected by detecting the amount of strain 144. Also, as the mass m of liquid 142 becomes larger, force F1 generated by acceleration a1 becomes larger and more detectable by strain sensor 120 or 130. Accordingly, in some embodiments, liquid 142 may include a material having a large specific gravity, e.g., a greater specific gravity than water.

In some embodiments, strain sensor 130 formed on the lower surface of film layer 110 may be configured to convert strain 144 into electrical charges, which may be output, e.g., as a voltage signal. Detection circuit 150 may be configured to receive an output signal from strain sensor 130 and determine the amount of strain 144 based on a level of the output signal. Additionally, detection circuit 150 may be further configured to receive an output signal from strain sensor 120 for more accurate determination of the amount of strain 144. For example, the upper and lower surfaces of film layer 110 may be strained in response to force F1 as well as other force generated by outside noise factors such as vibration caused by audio sound. Also, there may be a fluctuation in output signals from strain sensors 120 and 130 due to a change in ambient temperature. To cancel such noise factors in the output signals from strain sensors 120 and 130, detection circuit 150 may be configured to determine a difference between the output signals from strain sensors 120 and 130. In the example of FIG. 3, strain 144 generated by acceleration a1 may cause only strain sensor 130 to generate an output signal in proportion to the amount of strain 144, while both strain sensors 120 and 130 may be affected by strain generated by other noise factors such as ambient temperature change. Such noise components in the output signals from strain sensors may be cancelled out by subtracting the output signal from strain sensor 120 from the output signal from strain sensor 130.

Figure 4:
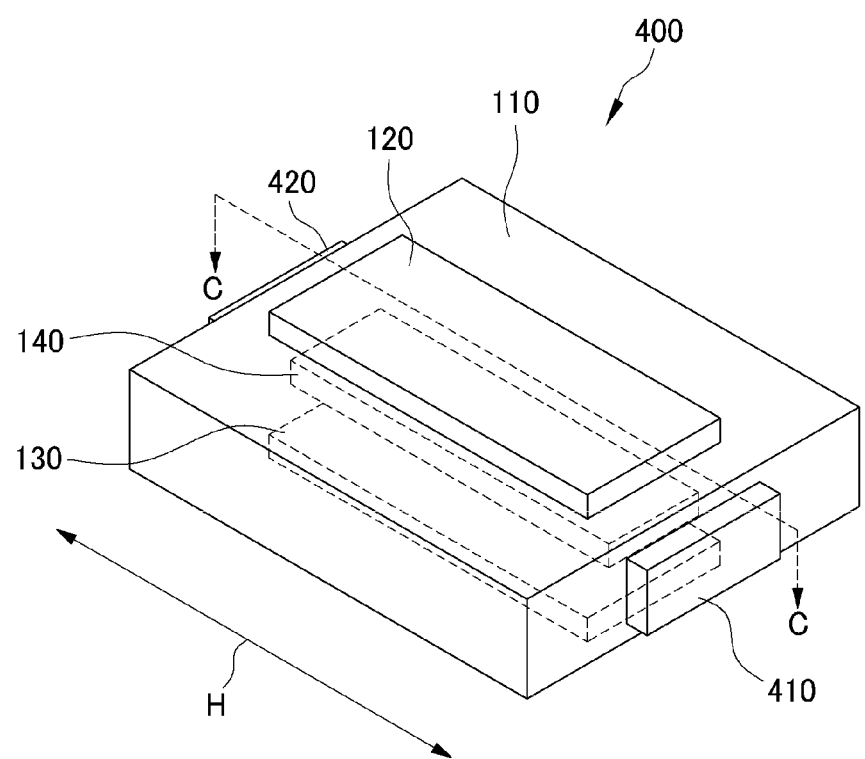
FIG. 4 schematically shows a perspective view of another example accelerometer.

FIG. 4 schematically shows a perspective view of another example accelerometer, arranged in accordance with at least some embodiments described herein. An accelerometer 400 shown in FIG. 4 may have a similar configuration to accelerometer 100 shown in FIG. 1A except that accelerometer 400 may further include a strain sensor 410 and a strain sensor 420 (e.g., see FIG. 5). In FIG. 4, similar elements to those shown in FIG. 1A are indicated with similar reference numerals, and thus a description thereof will be omitted for the sake of simplicity.

As depicted, strain sensor 410 may be formed on a front surface of film layer 110 while the other strain sensor 420 may be formed on a back surface of film layer 110. Strain sensors 410 and 420 may be configured to detect strain generated on the front and back surfaces of film layer, which may be generated by a force applied by a movement of liquid 142 in a horizontal direction (as indicated by H in FIG. 4).

Figure 5:
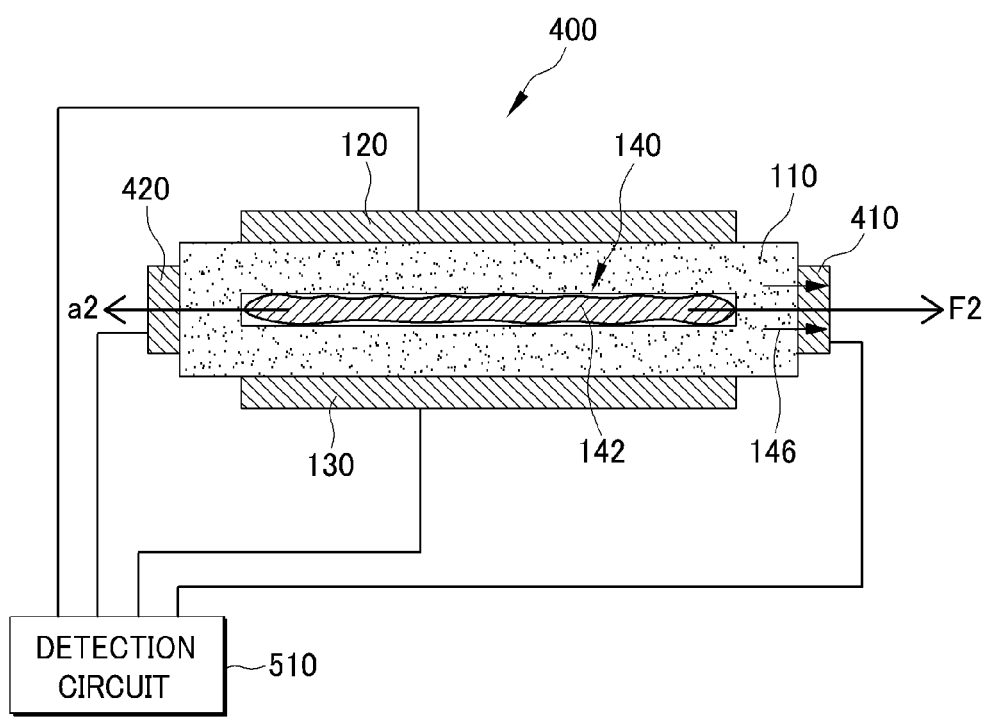
FIG. 5 schematically shows a cross-sectional view of another example accelerometer configured to detect a movement of a liquid contained in a liquid flow path in the accelerometer.

FIG. 5 schematically shows a cross-sectional view of another example accelerometer configured to detect a movement of a liquid contained in a liquid flow path in the accelerometer, arranged in accordance with at least some embodiments described herein. In particular, FIG. 5 schematically shows a cross-sectional view of accelerometer such as accelerometer 400 of FIG. 4, which is taken along the line C-C. As depicted, strain sensors 410 and 420 of accelerometer 400 may be coupled to a detection circuit 510. Detection circuit 510 may be configured to detect acceleration based on at least in part on an output signal from at least one of strain sensors 120, 130, 410, and 420.

For example, let the mass of liquid 142 filled in liquid flow path 140 be denoted by m. Assuming that an acceleration a2 is applied to accelerometer 400, a force F2 (F2=m×a2) acting on liquid 142 may be generated substantially in an opposing direction to acceleration a2. Force F2 may cause a stress 146 on the front surface of film layer 110, which may result in a strain on the front surface of film layer 110. Since the amount of strain 146 is proportional to acceleration a2, acceleration a2 applied to accelerometer 400 may be detected by detecting the amount of strain 146. Also, similar to the embodiment in FIG. 3, liquid 142 may include a material having a large specific gravity, e.g., a greater specific gravity than water.

In some embodiments, strain sensor 410 formed on the front surface of film layer 110 may be configured to convert stress 146 into electrical charges, which may be output, e.g., as a voltage signal. Detection circuit 510 may be configured to receive an output signal from strain sensor 410 and determine the amount of stress 146 based on a level of the output signal. Additionally, detection circuit 510 may be further configured to receive an output signal from strain sensor 420 for more accurate determination of the amount of stress 146. In particular, similar to the embodiment in FIG. 3, to cancel noise factors in the output signals from strain sensors 410 and 420, detection circuit 510 may be configured to determine a difference between the output signals from strain sensors 410 and 420.

Figure 6:
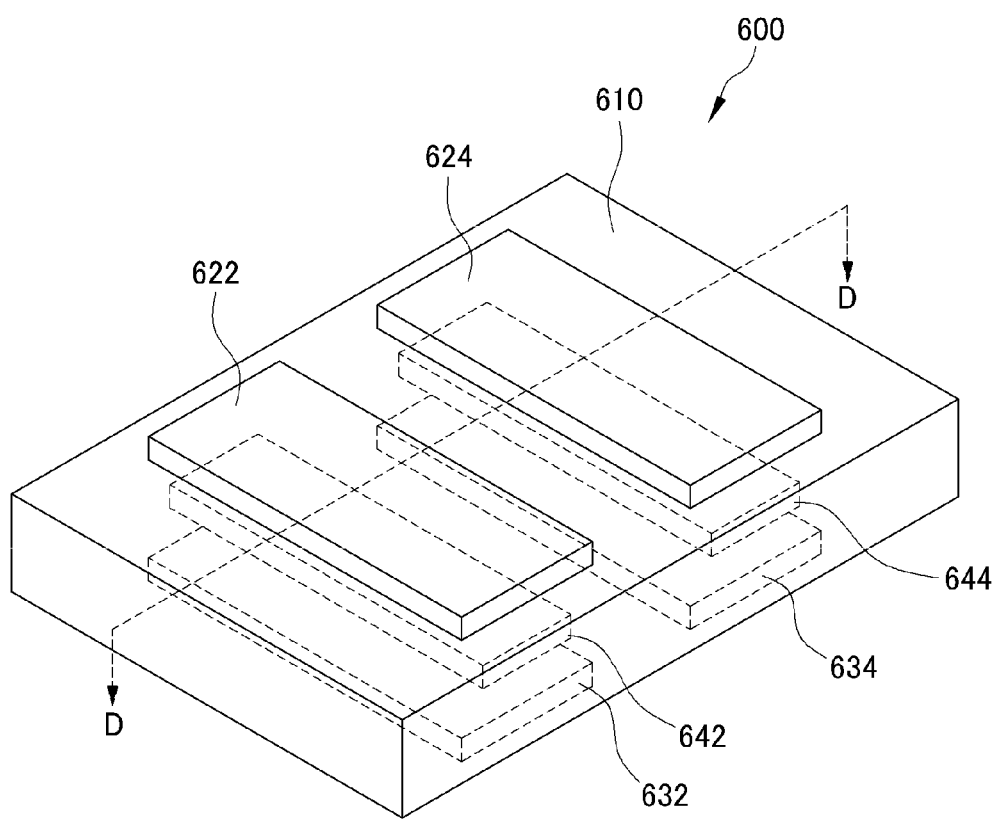
FIG. 6 schematically shows a perspective view of yet another example accelerometer.

FIG. 6 schematically shows a perspective view of yet another example accelerometer, arranged in accordance with at least some embodiments described herein. As depicted, an accelerometer 600 may include a film layer 610, strain sensors 622 and 624 which are formed on an upper surface of film layer 610 such that their elongated directions are arranged substantially in parallel to each other. Also, accelerometer 600 may include strain sensors 632 and 634 which are formed on a lower surface of film layer 610 such that their elongated directions are arranged substantially in parallel to each other. Further, liquid flow path 642 may be formed in film layer 610 such that liquid flow path 642 may be disposed substantially between strain sensors 622 and 632 or disposed in the vicinity of at least one of strain sensors 622 and 632. An elongated direction of liquid flow path 642 may be arranged substantially in parallel to those of strain sensors 622 and 632. Additionally, liquid flow path 644 may be formed in film layer 610 such that liquid flow path 644 may be disposed substantially between strain sensors 624 and 634 or disposed in the vicinity of at least one of strain sensors 624 and 634. An elongated direction of liquid flow path 644 may be arranged substantially in parallel to those of strain sensors 624 and 634. Each of strain sensors 622, 632, 624, and 634 may be configured to detect deformation on at least one of upper and lower surfaces of film layer 610.

In some embodiments, film layer 160 may be formed in a rectangular plate shape with its thickness smaller than either its width or length. Alternatively, film layer 610 may be formed in any other shape including, but not limited to, a polygonal or circular plate shape. Also, film layer 610 may be made of any film-type flexible material such as plastic resin. For example, film layer 610 may be formed using at least one of PET, PC, PEN and PI. The material of film layer 610 may be optically transparent to facilitate bonding of two or more film layers using ultraviolet light, which will be described later. Alternatively, film layer 610 may be made of a thin film glass material.

In some embodiments, each of strain sensors 622, 632, 624, and 634 may be formed in a rectangular plate shape with its thickness smaller than either its width or length. As illustrated in FIG. 6, the width and length of each of strain sensors 622, 632, 624, and 634 may be set to be smaller than corresponding width and length of film layer 610 such that strain sensors 622 and 624 and strain sensors 632 and 634 can be arranged within the upper and lower surfaces of film layer 610, respectively. Further, strain sensors 622, 632, 624, and 634 may be implemented using a piezoelectric material. For example, strain sensors 622, 632, 624, and 634 may be formed using at least one of PZT, AlN, BZT-BCT, and PVDF. Alternatively, strain sensors 622, 632, 624, and 634 may be formed using a strain gauge including a thin metallic film.

Figure 7:
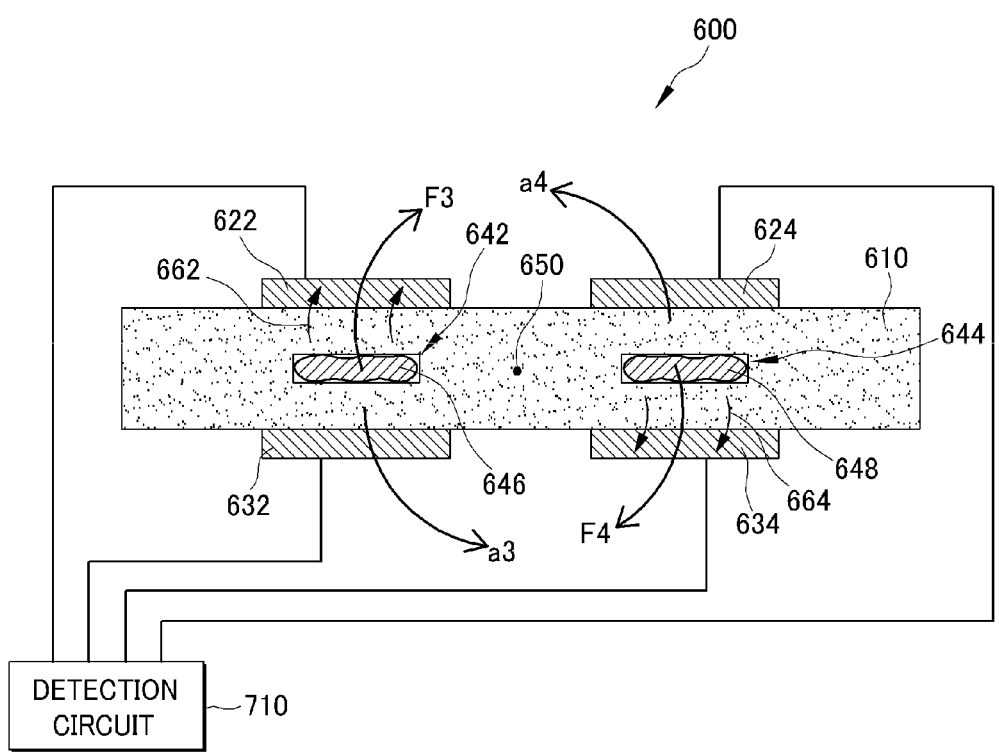
FIG. 7 schematically shows a cross-sectional view of yet another example accelerometer configured to detect a movement of liquids contained in liquid flow paths in the accelerometer.

FIG. 7 schematically shows a cross-sectional view of yet another example accelerometer configured to detect a movement of liquids contained in liquid flow paths in the accelerometer, arranged in accordance with at least some embodiments described herein. In particular, FIG. 7 schematically shows a cross-sectional view of accelerometer 600, which is taken along the line D-D as indicated in FIG. 6. As depicted, strain sensors 622, 632, 624, and 634 of accelerometer 600 may be coupled to a detection circuit 710. Detection circuit 710 may be configured to detect acceleration based on at least in part on an output signal from at least one of strain sensors strain sensors 622, 632, 624, and 634.

For example, let the mass of each liquid 646 and 648 filled in liquid flow paths 642 and 644 be denoted by m. Assuming that accelerometer 600 moves in a circular direction along a center point 650, acceleration a3 and a4 may be applied to liquids 646 and 648, respectively. With such acceleration, forces F3 (F3=m×a3) and F4 (F4=m×a4) acting on liquids 646 and 648, respectively, may be generated substantially in an opposing direction to acceleration a3 and a4. Force F3 may cause a stress 662 on the upper surface of film layer 610, which may result in a strain on a part of the upper surface of film layer 610 where strain sensor 622 is disposed. Furthermore, Force F4 may cause a stress 664 on the lower surface of film layer 610, which may result in a strain on a part of the lower surface of film layer 610 where strain sensor 634 is disposed. Since the amounts of stresses 662 and 664 are proportional to acceleration a3 and a4, respectively, acceleration a3 and a4 applied to accelerometer 400 may be detected by detecting the amounts of stresses 662 and 664. Also, similar to the embodiments in FIGS. 3 and 5, liquids 646 and 648 may include a material having a large specific gravity, e.g., a greater specific gravity than water.

In some embodiments, strain sensors 622 and 634 formed on the upper and lower surfaces of accelerometer 600, respectively, may be configured to convert stresses 662 and 664 into electrical charges, which may be output as a signal, e.g., as a voltage or current. Detection circuit 710 may be configured to receive output signals from strain sensors 622 and 634 and determine the amount of stresses 662 and 664, respectively, based on levels of the output signals. Additionally, detection circuit 710 may be further configured to receive output signals from strain sensors 632 and 624, respectively, for more accurate determination of the amounts of stresses 662 and 664. In particular, similar to the embodiments in FIGS. 3 and 5, to cancel noise factors in the output signals from strain sensors 622, 624, 632, and 634, detection circuit 710 may be configured to determine a difference between the output signals from strain sensors 622 and 632 and a difference between the output signals from strain sensors 624 and 634.

Figure 8A:
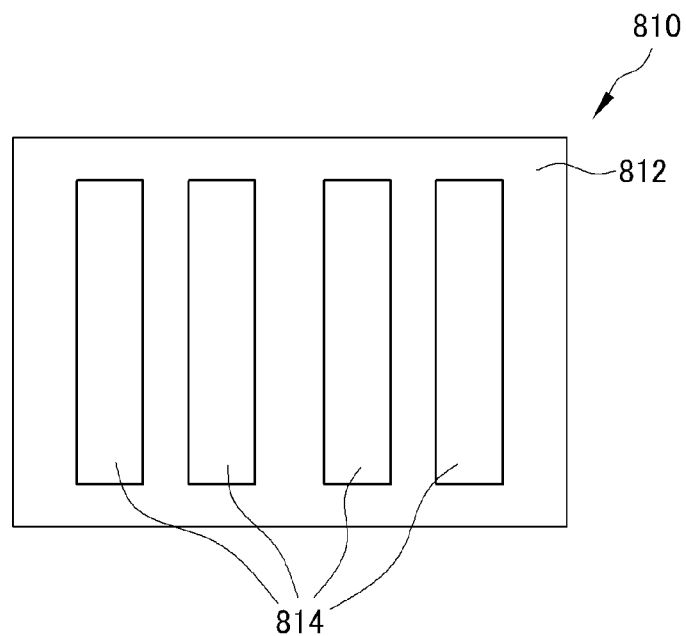
FIGS. 8A to 8C schematically show plane views of example accelerometers including different arrangements of strain sensors on surfaces of the accelerometers.
Figure 8B:
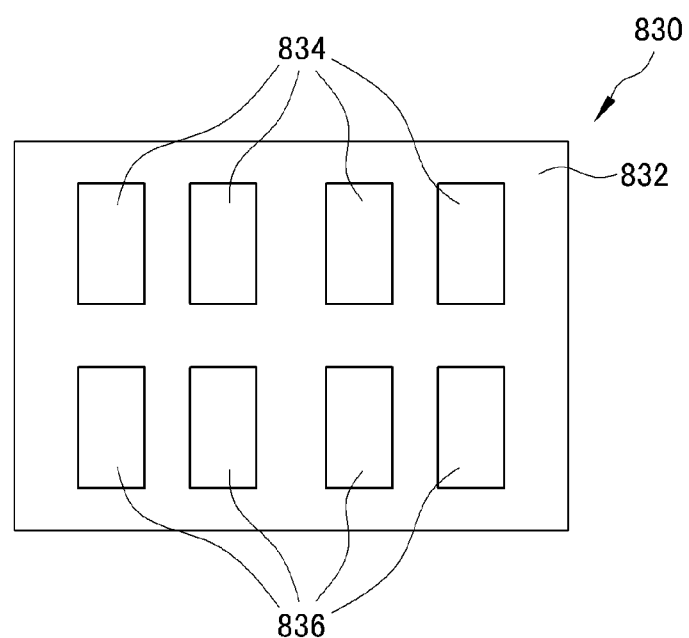
Figure 8C:
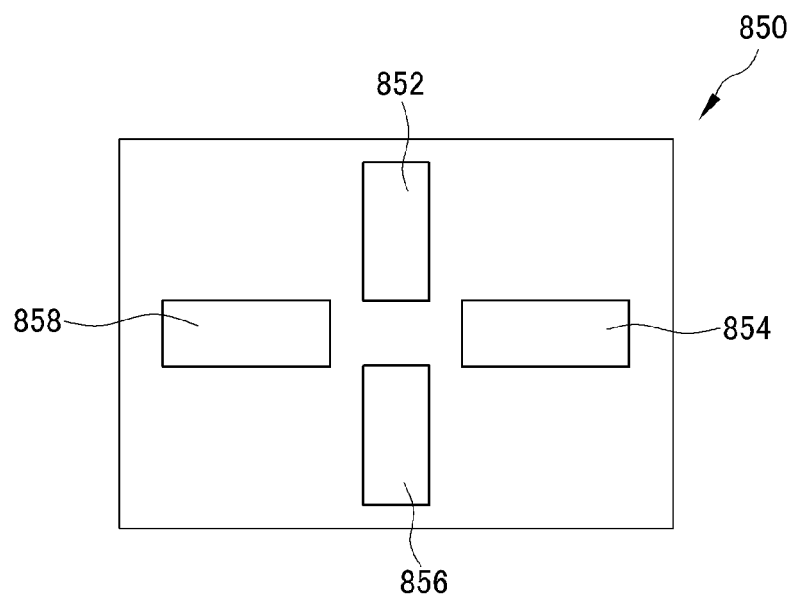

Although the above embodiments illustrate specific number of liquid flow paths and strain sensors provided on the surfaces of the film layers, the number of liquid flow paths and/or strain sensors may not be limited thereto. In some embodiments, a different number of liquid flow paths and/or strain sensors may be provided in different patterns on the surfaces of the film layers. FIGS. 8A to 8C schematically show plane views of example accelerometers including different arrangements of strain sensors on surfaces of the accelerometers, accordance with at least some embodiments described herein.

As shown in FIG. 8A, an example accelerometer 810 may include four linear strain sensors 814 configured in a single row with each in a substantially parallel orientation with respect to each other on a surface of a film layer 812. This arrangement of strain sensors 814 may be used in detecting a combination of linear and circular movements of accelerometer 810.

Another example of strain sensor arrangement is illustrated in FIG. 8B, where an accelerometer 830 may include eight strain sensors 834, 836 configured in two rows. The first row may include four rectangular strain sensors 834 each being in a substantially parallel orientation with respect to each other in an upper portion of a surface of a film layer 832. The second row may include another four rectangular strain sensors 836 each being in a substantially parallel orientation with respect to each other in a lower portion of the same surface of film layer 832. This arrangement of strain sensors 834 and 836 may be used in detecting a different combination of linear and circular movements of accelerometer 830 from that of accelerometer 810.

FIG. 8C illustrates an accelerometer 850 where four strain sensors 852, 854, 856, and 858 are arranged in a crosswise configuration, where strain sensors 852, 856 are aligned along a vertical axis and strain sensors 858, 854 are aligned along a horizontal axis. This arrangement of strain sensors 852, 854, 856, and 858 may be used in detecting four different directional movements of accelerometer 850.

Figure 9:
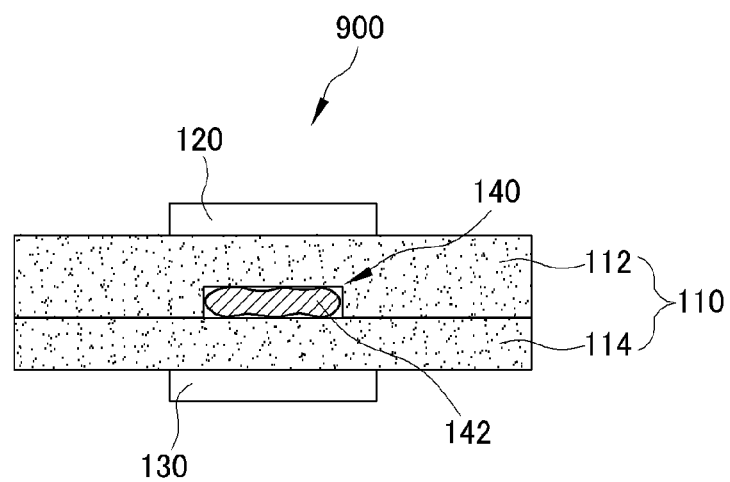
FIG. 9 schematically shows a cross-sectional view of still another example accelerometer.

FIG. 9 schematically shows a cross-sectional view of still another example accelerometer, arranged in accordance with at least some embodiments described herein. An accelerometer 900 shown in FIG. 9 may have a similar configuration to accelerometer 100 shown in FIG. 1A, except that film layer 110 may include an upper film layer 112 and a lower film layer 114 which may be adhered to each other. In FIG. 9, similar elements to those shown in FIG. 1A are indicated with similar reference numerals, and thus a description thereof will be omitted for the sake of simplicity.

In some embodiments, liquid flow path 140 containing liquid 142 may be formed in at least one of upper and lower film layers 112 and 114. For example, as depicted in FIG. 9, liquid flow path 140 may be formed in upper film layer 112. The following is a description of an example method for fabricating accelerometers such as accelerometer 900 from FIG. 9.

Figure 10:
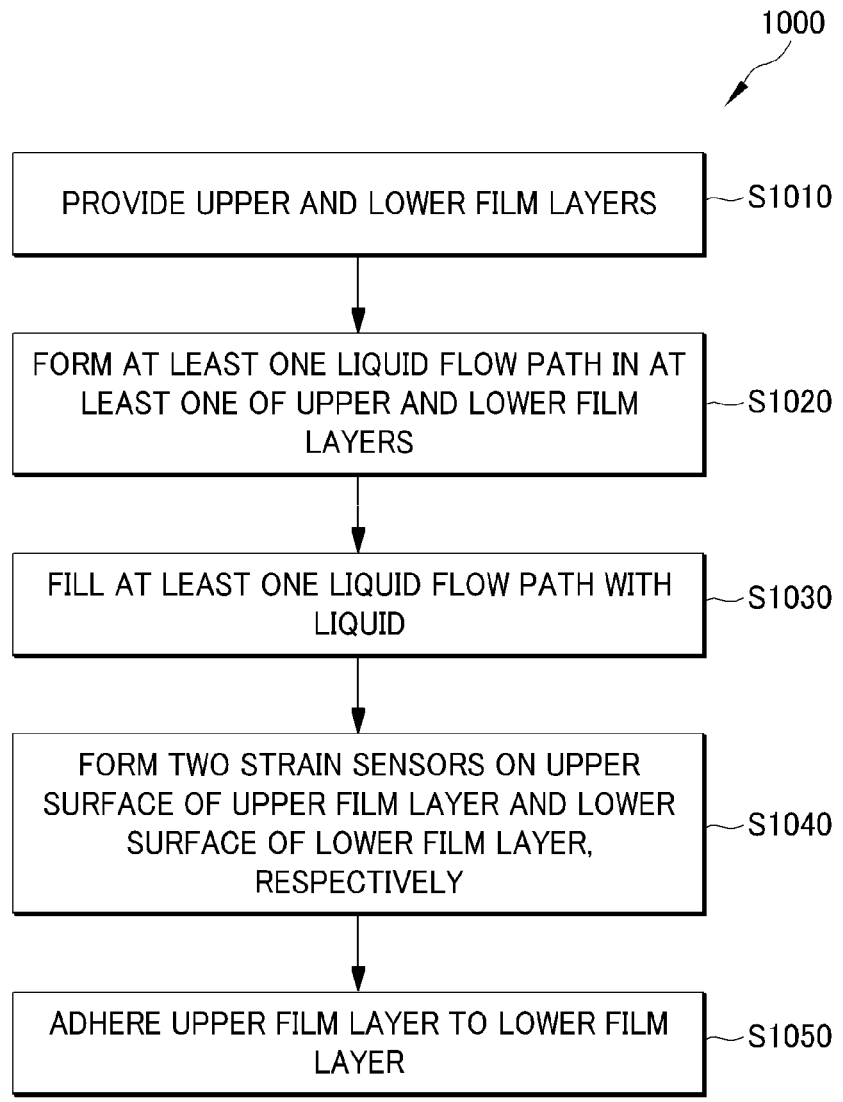
FIG. 10 illustrates an example flow diagram of a method adapted to fabricate an accelerometer.

FIG. 10 illustrates an example flow diagram of a method adapted to fabricate an accelerometer, arranged in accordance with at least some embodiments described herein. FIGS. 11A to 11E schematically show example processes for fabricating an accelerometer that is arranged in accordance with at least some embodiments described herein. FIGS. 10 and 11A to 11E will be discussed together as follows below.

An example method 1000 in FIG. 10 may be implemented using, for example, a computing device including a processor adapted to control a micro-machining equipment. Additionally and/or alternatively, method 1000 may be implemented using, for example, a roll-to-roll (R2R) processing equipment.

Method 1000 may include one or more operations, actions, or functions as illustrated by one or more of blocks S1010, S1020, S1030, S1040 and/or S1050. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 1000 may begin at block S1010, "PROVIDE UPPER AND LOWER FILM LAYERS."

Figure 11A:
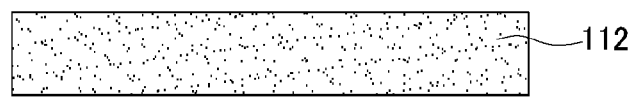
FIGS. 11A to 11E schematically show example processes for fabricating an accelerometer, all arranged in accordance with at least some embodiments described herein.
Figure 11A:
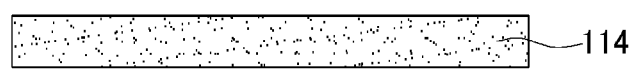

At block S1010, two film layers, e.g., an upper film layer and a lower film layer may be provided. As depicted in FIG. 11A, an upper film layer 112 and a lower film layer 114 may be provided. In some embodiments, film layers 112 and 114 may be made of plastic resin, which may be optically transparent. For example, the plastic resin may include at least one of PET, PC, PEN and PI. Alternatively, film layers 112 and 114 may be made of a thin film glass substrate. In some embodiments, upper film layer 112 may have a larger thickness than lower film layer 144, such that upper film layer 112 can have a thickness sufficient to accommodate a liquid flow path (which will be described later). For example, if the liquid flow path has a thickness of tens of micrometers, the upper film layer 112 may have a thickness of about 100 micrometers. Block S1010 may be followed by block S1020, "FORM AT LEAST ONE LIQUID FLOW PATH IN AT LEAST ONE OF UPPER AND LOWER FILM LAYERS."

Figure 11B:
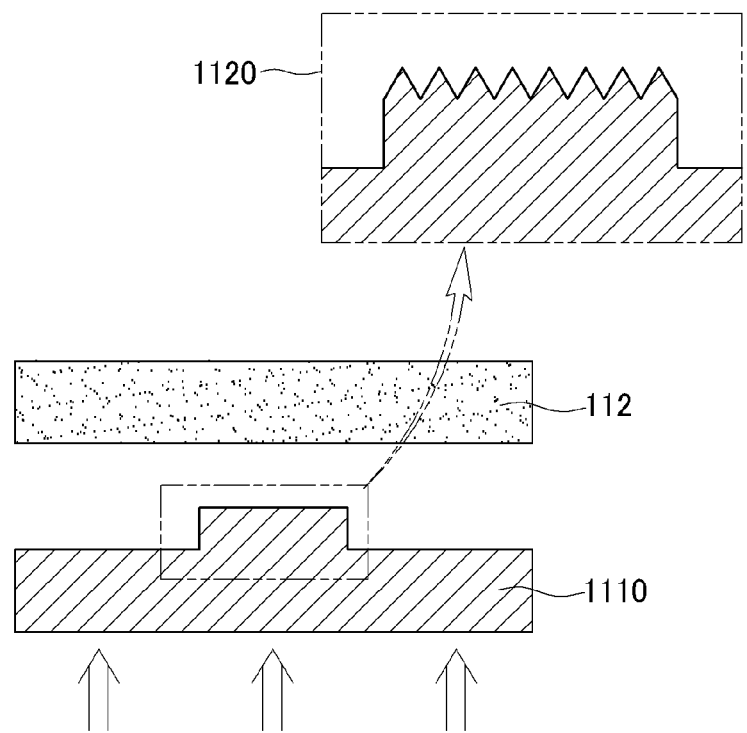
Figure 11C:
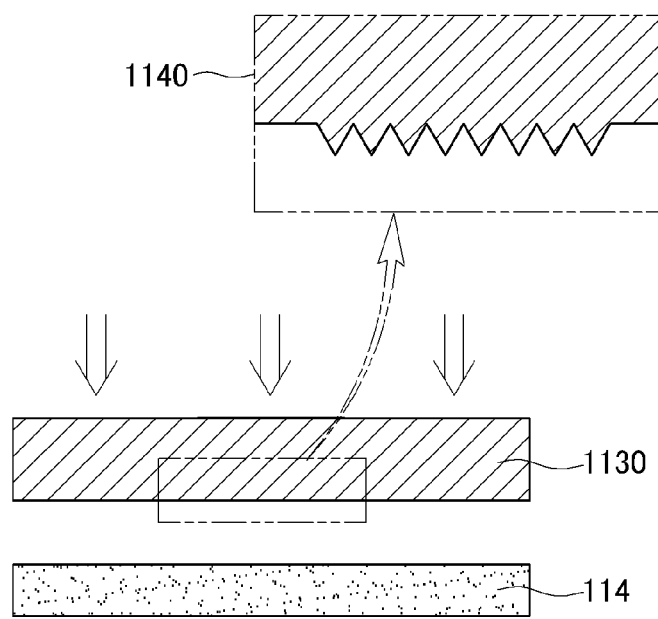
Figure 11D:
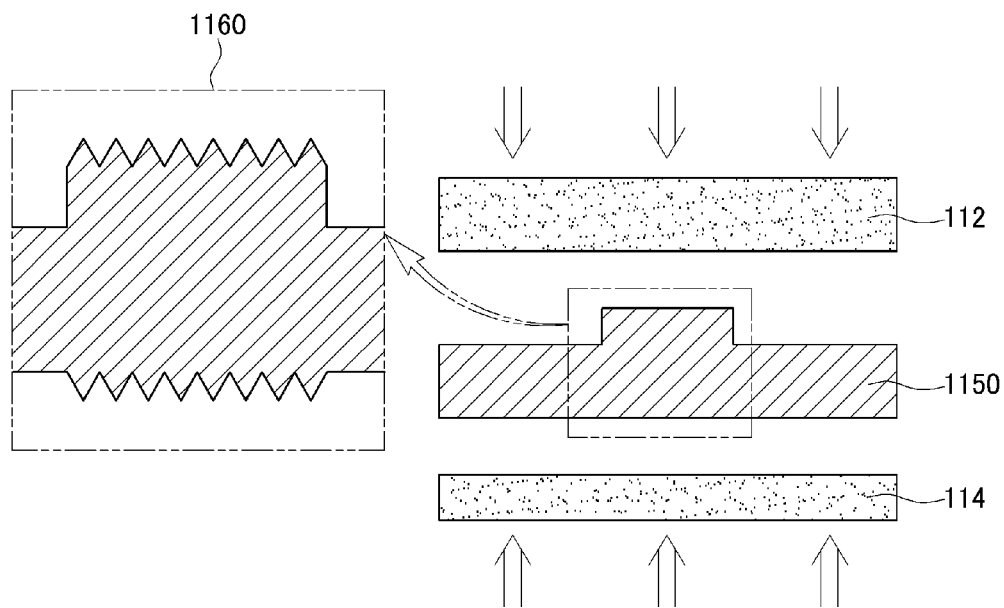

At block S1020, at least one liquid flow path may be formed in at least one of the upper and lower film layers. As illustrated in FIG. 11B, a liquid flow path pattern 1120 may be transferred onto a lower surface of upper film layer 112 by pressing a mold 1110. For example, liquid flow path pattern 1120 may have a water-repellent pattern such as a wedge-shaped structure. Also, as illustrated in FIG. 11C, another liquid flow path pattern 1140 may be transferred onto an upper surface of lower film layer 114 by pressing another mold 1130. For example, liquid flow path pattern 1140 may have a water-repellent pattern such as a wedge-shaped structure. Alternatively, as illustrated in FIG. 11D, a liquid flow path pattern 1160 may be transferred simultaneously onto both a lower surface of upper film layer 112 and an upper surface of lower film layer 114 by pressing upper and lower film layers 112 and 114 against a mold 1150. In some other embodiments, instead of forming a liquid flow path with a water-repellent pattern, a water-repellent material may be coated on surfaces of the liquid flow path formed in at least one of the upper and lower film layers. Block S1020 may be followed by block S1030, "FILL AT LEAST ONE LIQUID FLOW PATH WITH LIQUID."

Figure 11E:
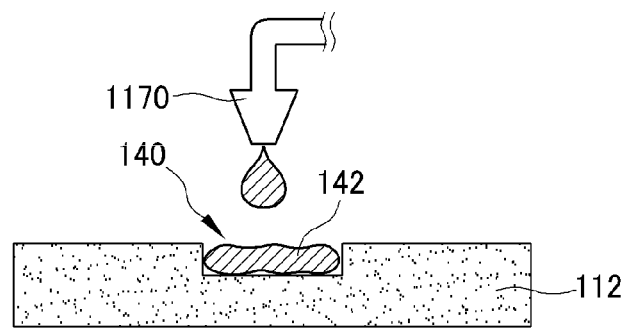

At block S1030, the at least one liquid flow path may be filled with a liquid. The liquid filled in the liquid flow path may include a material such as metal nanoparticle ink, which has a higher specific gravity than that of water. As illustrated in FIG. 11E, a liquid flow path 140 formed in upper film layer 112 may be filled with a liquid 142 by injecting liquid 142 into liquid flow path 140 using a dispenser or an inkjet nozzle 1170. Block S1030 may be followed by block S1040, "FORM TWO STRAIN SENSORS ON UPPER SURFACE OF UPPER FILM LAYER AND LOWER SURFACE OF LOWER FILM LAYER, RESPECTIVELY."

At block S1040, two strain sensors may be formed on an upper surface of the upper film layer and a lower surface of the lower film layer, respectively. For example, the strain sensors may be formed by applying a liquid piezoelectric material at predetermined regions on the upper surface of the upper film layer and the lower surface of the lower film layer. In some embodiments, the liquid piezoelectric material may be applied using an ink-jet process or a printing process. Additionally, an electrical wiring for connecting the strain sensors to a detection circuit may be formed in the upper and lower film layers. Block S1040 may be followed by block S1050, "ADHERE UPPER FILM LAYER TO LOWER FILM LAYER."

At block S1050, the upper film layer may be adhered to the lower film layer. For example, the upper film layer may be bonded to the lower film layer using an adhesive or any other suitable type of bonding material. In some embodiments, for the purpose of bonding the upper film layer to the lower film layer, an ultraviolet curing resin may be applied to the surfaces of the upper and lower film layers. The upper and lower film layers may be then attached to each other while being irradiated with ultraviolet light. In alternative embodiments, the upper and lower film layers may be formed using a thermosetting resin. In this case, the process of applying heat and pressure to bond the upper and lower film layers.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An accelerometer, comprising:
    a film layer including at least one liquid flow path that contains a liquid and that is arranged in the film layer, wherein at least one surface of the at least one liquid flow path is water-repellent; and
    at least one strain sensor formed on at least one surface of the film layer in a vicinity of the at least one liquid flow path, the at least one strain sensor being configured to detect deformation on the at least one surface of the film layer, wherein the accelerometer is configured to detect acceleration based at least in part on an output signal from the at least one strain sensor.

2. The accelerometer of claim 1, wherein the film layer further includes an upper film layer and a lower film layer adhered to each other, and wherein the at least one liquid flow path is formed in at least one of the upper and lower film layers.

3. The accelerometer of claim 2, wherein the at least one strain sensor includes two strain sensors wherein one of the two strain sensors is formed on an upper surface of the upper film layer and an other of the two strain sensors is formed on a lower surface of the lower film layer, such that the at least one liquid flow path is disposed substantially between the two strain sensors.

4. The accelerometer of claim 3, wherein to detect acceleration based at least in part on the output signal from the at least one strain sensor, the accelerometer is configured to detect the acceleration based at least in part on a difference between output signals from the two strain sensors.

5. An accelerometer, comprising:
a film layer including at least one liquid flow path that contains a liquid and that is arranged in the film layer, wherein the film layer is made of plastic resin; and
at least one strain sensor formed on at least one surface of the film layer in a vicinity of the at least one liquid flow path, the at least one strain sensor being configured to detect deformation on the at least one surface of the film layer, wherein the accelerometer is configured to detect acceleration based at least in part on an output signal from the at least one strain sensor.

6. The accelerometer of claim 5, wherein the plastic resin includes one or more materials selected from a group consisting of PET (polyethylene terephthalate), PC (polycarbonate), PEN (polyethylene naphthalate) and PI (polyimide).

7. The accelerometer of claim 5, wherein the plastic resin is optically transparent.

8. An accelerometer, comprising:
a film layer including at least one liquid flow path that contains a liquid and that is arranged in the film layer, wherein the film layer is made of a thin film glass substrate; and
at least one strain sensor formed on at least one surface of the film layer in a vicinity of the at least one liquid flow path, the at least one strain sensor being configured to detect deformation on the at least one surface of the film layer, wherein the accelerometer is configured to detect acceleration based at least in part on an output signal from the at least one strain sensor.

9. The accelerometer of claim 1, wherein the at least one strain sensor is made of a piezoelectric material.

10. The accelerometer of claim 9, wherein the piezoelectric material includes one or more materials selected from a group consisting of PZT (lead zirconate titanate), AlN (aluminum nitride), BZT-BCT (barium zirconium titanate-barium calcium titanate), and PVDF (polyvinylidene fluoride).

11. The accelerometer of claim 1, wherein the at least one strain sensor includes a strain gauge including a thin metallic film.

12. The accelerometer of claim 1 wherein the at least one surface of the at least one liquid flow path has a wedge-shaped structure.

13. The accelerometer of claim 1, wherein the at least one surface of the at least one liquid flow path is coated with a water-repellent material including fluoropolymer.

14. The accelerometer of claim 1, wherein the liquid has a higher specific gravity than that of water.

15. The accelerometer of claim 14, wherein the liquid includes metal nanoparticle ink.

16. An accelerometer, comprising:
an upper film layer and a lower film layer adhered to each other, wherein at least one liquid flow path that contains a liquid is formed in at least one of the upper and lower film layers, and at least one of the upper and lower film layers is made of plastic resin; and
two strain sensors, wherein one of the two strain sensors is formed on an upper surface of the upper film layer and an other of the two strain sensors is formed on a lower surface of the lower film layer, such that the at least one liquid flow path is disposed substantially between the two strain sensors, each of the two strain sensors being configured to detect deformation on at least one surface of the upper and lower film layers, wherein the accelerometer is configured to detect acceleration based at least in part on an output signal from at least one of the two strain sensors.

17. The accelerometer of claim 16, wherein to detect acceleration based at least in part on the output signal from the at least one of the two strain sensor, the accelerometer is configured to detect the acceleration based at least in part on difference between output signals from the two strain sensors.

18. The accelerometer of claim 16, wherein the plastic resin includes one or more materials selected from a group consisting of PET (polyethylene terephthalate), PC (polycarbonate), PEN (polyethylene naphthalate) and PI (polyimide).

19. The accelerometer of claim 16, wherein the plastic resin is optically transparent.

20. The accelerometer of claim 16, wherein at least one of the upper and lower film layers is made of a thin film glass substrate.

21. The accelerometer of claim 16, wherein at least one of the two strain sensors is made of a piezoelectric material.

22. The accelerometer of claim 21, wherein the piezoelectric material includes one or more materials selected from a group consisting of PZT (lead zirconate titanate), AlN (aluminum nitride), BZT-BCT (barium zirconium titanate-barium calcium titanate), and PVDF (polyvinylidene fluoride).

23. The accelerometer of claim 16, wherein at least one of the two strain sensors includes a strain gauge including a thin metallic film.

24. The accelerometer of claim 16, wherein at least one surface of the at least one liquid flow path is water-repellent.

25. The accelerometer of claim 24, wherein the at least one surface of the at least one liquid flow path has a wedge-shaped structure.

26. The accelerometer of claim 24, wherein the at least one surface of the at least one liquid flow path is coated with a water-repellent material including fluoropolymer.

27. The accelerometer of claim 16, wherein the liquid has a higher specific gravity than that of water.

28. The accelerometer of claim 27, wherein the liquid includes metal nanoparticle ink.

29. A method to fabricate an accelerometer, comprising:
providing an upper film layer and a lower film layer;
forming at least one liquid flow path in at least one of the upper and lower film layers, wherein at least one surface of the at least one liquid flow path is water-repellent;
filling the at least one liquid flow path with a liquid;
forming two strain sensors on a upper surface of the upper film layer and a lower surface of the lower film layer, respectively, such that the at least one liquid flow path is disposed substantially between the two strain sensors, each of the two strain sensors being configured to detect deformation on at least one surface of the upper and lower film layers, wherein the accelerometer is configured to detect acceleration based at least in part on an output signal from at least one of the two strain sensors; and
adhering the upper film layer to the lower film layer.

30. The method of claim 29, wherein the forming the at least one liquid flow path includes transferring a liquid flow path pattern onto the at least one of the upper and lower film layers using a mold.

31. The method of claim 30, wherein the forming the at least one liquid flow path includes forming a water-repellent pattern on at least one surface of the at least one liquid flow path by using the mold with a corresponding water-repellent pattern.

32. The method of claim 30, wherein the forming the at least one liquid flow path includes coating a water-repellent material on the at least one surface of the at least one liquid flow path.

33. The method of claim 29, wherein the filling the at least one liquid flow path with the liquid includes injecting the liquid into the at least one liquid flow path using a dispenser or an inkjet nozzle.

34. The method of claim 29, wherein the forming the two strain sensors includes applying a liquid piezoelectric material at specific regions on the upper surface of the upper film layer and the lower surface of the lower film layer.

35. The method of claim 34, wherein the applying the liquid piezoelectric material is performed using an ink-jet process or a printing process.

36. The method of claim 34, wherein the forming the two strain sensors includes forming an electrical wiring coupled to the two strain sensors.

37. The method of claim 29, wherein the adhering the upper film layer to the lower film layer is performed using an adhesive.

38. The method of claim 29, wherein the adhering the upper film layer to the lower film layer includes:
  applying an ultraviolet curing resin bonding on surfaces of the upper and lower film layers; and
  irradiating an ultraviolet light onto the surfaces of the upper and lower film layers.

39. The method of claim 29, wherein the method is performed using a roll-to-roll process.

40. An accelerometer manufactured by the method of claim 29.

* * * * *

UNITED STATES PATENT AND TRADEMARK OFFICE
CERTIFICATE OF CORRECTION

| | | |
|---|---|---|
| PATENT NO. | : 9,164,121 B2 | Page 1 of 1 |
| APPLICATION NO. | : 13/980577 | |
| DATED | : October 20, 2015 | |
| INVENTOR(S) | : Goto | |

It is certified that error appears in the above-identified patent and that said Letters Patent is hereby corrected as shown below:

In the specification

In Column 1, Line 8, delete "§371" and insert -- § 371 --, therefor.

In the claims

In Column 13, Line 46, in Claim 10, delete "AIN" and insert -- AlN --, therefor.

In Column 13, Line 52, in Claim 12, delete "claim 1" and insert -- claim 1, --, therefor.

In Column 13, Line 67, in Claim 16, delete "lavers" and insert -- layers --, therefor.

In Column 14, Line 31, in Claim 22, delete "AIN" and insert -- AlN --, therefor.

Signed and Sealed this
Eighth Day of March, 2016

Michelle K. Lee
*Director of the United States Patent and Trademark Office*